United States Patent [19]

Färber et al.

[11] Patent Number: 5,709,427
[45] Date of Patent: Jan. 20, 1998

[54] VEHICLE ROOF WITH A ROOF PANEL THAT CAN BE PIVOTED OPEN

[75] Inventors: Manfred Färber, Wielenbach; Thomas Wikelski, Schlagenhofen; Johann Mayer, Petershausen, all of Germany

[73] Assignee: Webasto Karosseriesysteme GmbH, Stockdorf, Germany

[21] Appl. No.: 584,140

[22] Filed: Jan. 11, 1996

[30]  Foreign Application Priority Data

Jan. 9, 1995 [DE] Germany ................ 195 00 367.5

[51] Int. Cl.⁶ .......................................... B60P 7/53
[52] U.S. Cl. .................. 296/214; 296/216; 296/222; 296/223
[58] Field of Search ................. 296/214, 222, 296/223, 219, 216; 49/414; 160/95, 270

[56]  References Cited

U.S. PATENT DOCUMENTS 5,250,882  10/1993  Odoi et al. ............... 296/223 X

FOREIGN PATENT DOCUMENTS

| 1269220 | 7/1961 | France ................... 296/214 |
| 34 27 772 C2 | 7/1986 | Germany . |
| 258213 | 10/1988 | Japan ..................... 296/214 |
| 455874 | 10/1936 | United Kingdom ........... 296/214 |

Primary Examiner—Dennis H. Pedder
Attorney, Agent, or Firm—Sixbey, Friedman, Leedom & Ferguson; David S. Safran

[57]  ABSTRACT

A vehicle roof with a roof panel (3) that can be pivoted to open, with a window shade (7) that is located under the roof panel (3) for alternately covering or at least partially uncovering the roof panel (3). The window shade (7) can be wound on a roller (8) and is connected to at least one rigid element (10, 24, 25) that runs crosswise to the direction of movement of the shade and is guided in longitudinally running lateral guide elements (11). To reduce the structural height of the vehicle roof or to increase the headroom for the passengers, guide elements (11) for the window shade are raised by a lifting mechanism (14) when window shade (7) is moved in a closing direction and are lowered when it is moved in an opening direction.

14 Claims, 4 Drawing Sheets

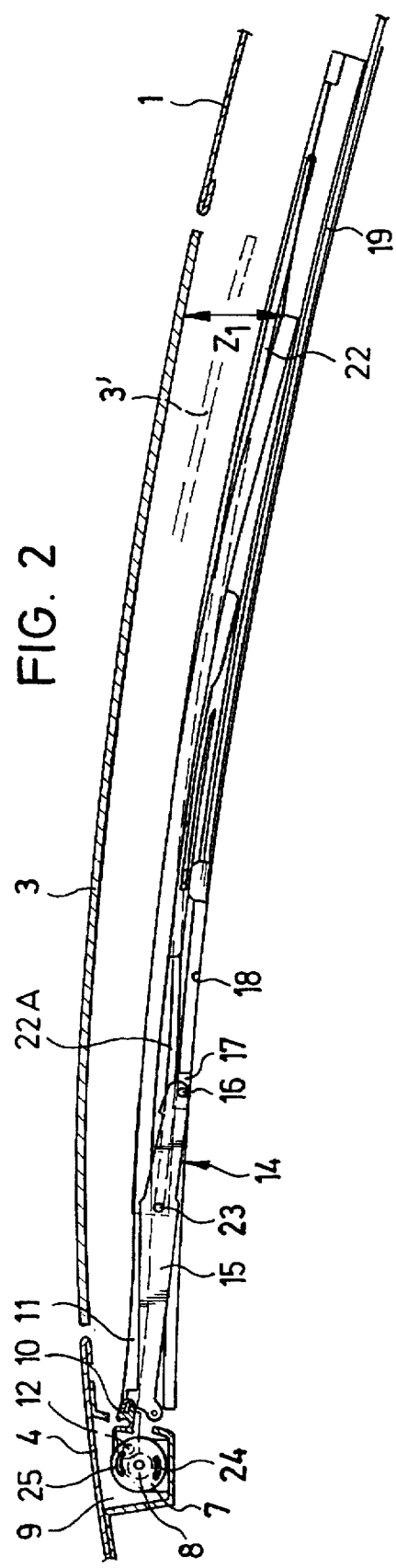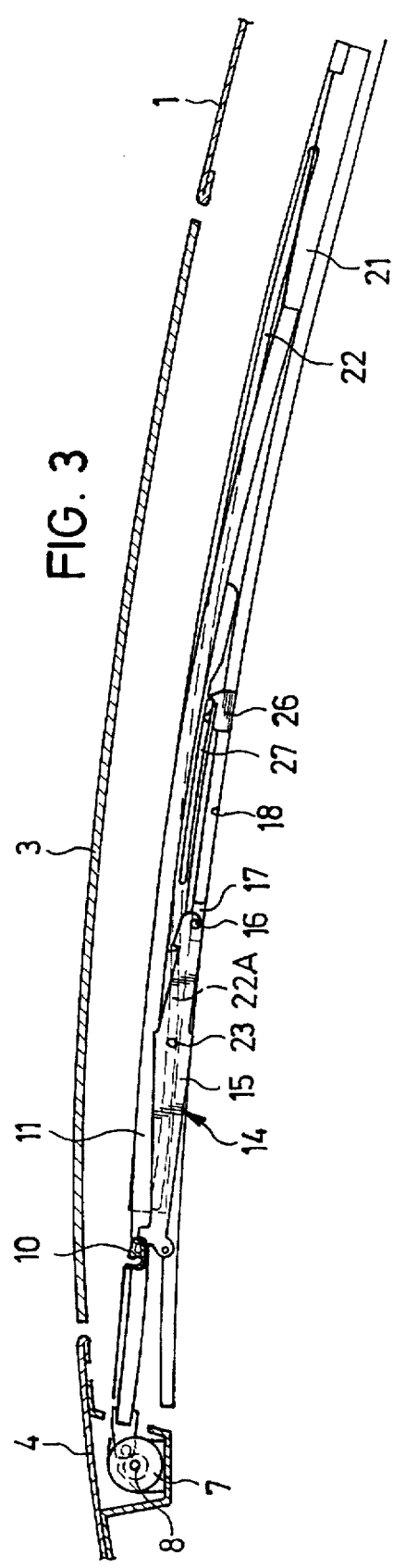

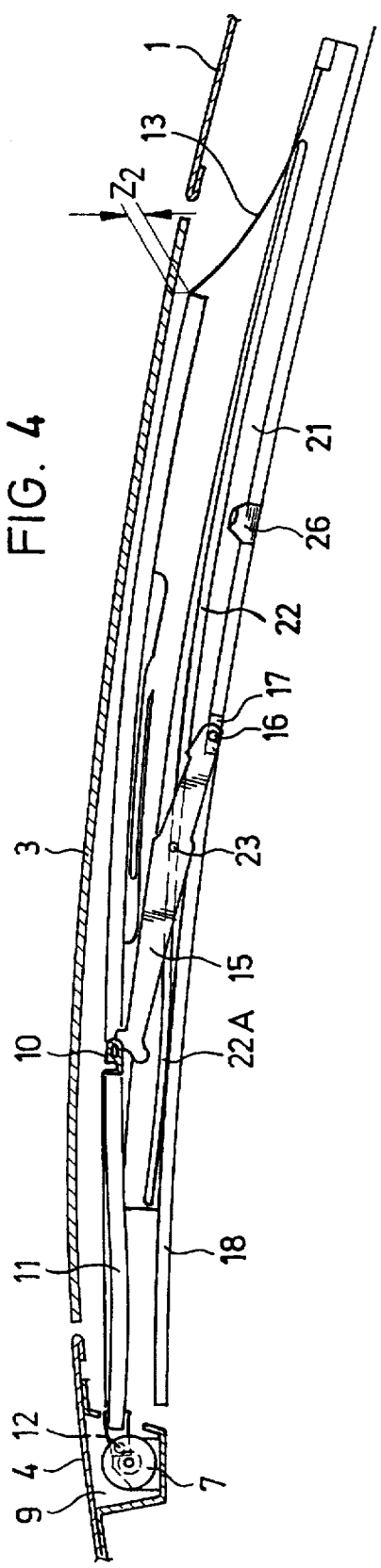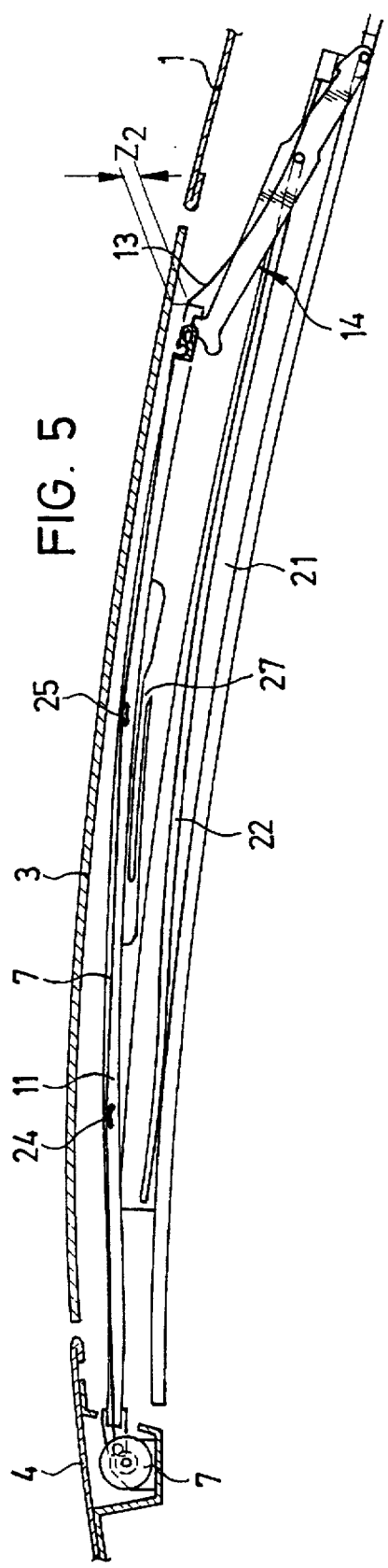

VEHICLE ROOF WITH A ROOF PANEL THAT CAN BE PIVOTED OPEN

BACKGROUND OF THE INVENTION

1. Field of the Invention

The invention relates to a vehicle roof with a roof panel that can be pivoted open, and under which a window shade that is able to be wound on a roller is located to alternately cover or at least partially uncover the roof panel. More particularly, to such a roof in which the window shade is connected to at least one rigid element that runs crosswise to the direction of movement and is guided in lateral, lengthwise-running guide elements.

2. Description of Related Art

From German Patent No. 34 27 772, a vehicle roof is known in which guide rails for a window shade form a curved guideway along which the window shade can be moved into a raised position to increase headroom. However, the moving of the window shade along a curved guideway requires an increased exertion of force. Furthermore, the parts of the window shade or of the rigid elements interacting with the guide elements are additionally subjected to increased wear.

SUMMARY OF THE INVENTION

In view of the foregoing, it is a primary object of the present invention is to provide a vehicle roof in which headroom can be increased with minimal operating forces.

This object and others are achieved according to this invention by raising the guide elements for the window shade by a lifting mechanism when the window shade is operated in the closing direction and by lowering them upon operation in the opening direction. Because the guide elements for the window shade are able to be raised and lowered, they can have a straight or only slightly curved path that makes it possible to operate them with a limited exertion of force.

According to an advantageous further development, it is provided that the guide elements are pivoted around a pivot pin that is placed in the area of the roller responsible for winding and unwinding the window shade. The pivoted arrangement of the guide elements and the selected position of the pivot pin makes it possible to have an especially simple raising and lowering of the guide elements.

Another advantageous configuration provides that the window shade and the lifting mechanism for the guide elements can be operated by the same drive. This drive is preferably an electric motor.

It is further advantageous if the lifting mechanism is coupled to a rigid front element of the window shade that runs ahead in the closing direction.

In an especially advantageous embodiment, the lifting mechanism includes a drag lever that has one end connected to the drive and is guided to slide in a stationary guide rail, and which has a second end that is coupled to the rigid front element. The drag lever has a control pin that is guided in a slide track which has sections that are not parallel to the stationary guide rail.

This slide track is preferably made as a separate molded part and attached to the stationary guide rail. In an alternative embodiment, an integral design of the slide and the stationary guide rail is possible. This invention can be used especially advantageously in combination with a vehicle roof in which the roof panel can be lowered, by an electric drive, to open it. Here, the drive of the roof panel and the drive of the window shade are advantageously coupled so that the roof panel can be lowered only when the window shade is open. With this coupling it is achieved that the space required for raising the window shade when it is in the closed state is made available, when it is opened, for the lowering of the roof panel.

The coupling of both drives is advantageously designed so that, even when the drive of the roof panel is operated when the window shade is closed, first the drive of the window shade is supplied with electricity in the opening direction and only after the window shade is opened is the drive of the roof panel activated to lower it. Such a coupling makes it possible for the operator, with a single operating movement, namely the operation of an operating element to lower the roof panel, simultaneously, to effect the opening of the window shade, which is required beforehand.

To increase the stability of a cloth window shade, it is advantageous if the shade has several spaced rigid elements which run crosswise to the direction of movement. Appropriately, to minimize the structural height of the vehicle roof, it is advantageous here if the distance between the rigid elements is selected so that they lie in different peripheral positions when the shade rolled up on the roller. In this way, the structural height in the area of the roller provided for winding can be additionally reduced by avoiding a superpositioning of the rigid elements. For the same purpose, it is advantageous if the rigid elements have a shape that is matched to the curve of the roller.

These and further objects, features and advantages of the present invention will become apparent from the following description when taken in connection with the accompanying drawings which, for purposes of illustration only, show a single preferred embodiment in accordance with the present invention.

BRIEF DESCRIPTION OF THE DRAWINGS

FIG. 2 is a lengthwise section taken along line II—II in FIG. 1, through guide mechanisms and the lifting mechanism of the window shade in its completely opened position;

FIG. 3 is a representation corresponding to that of FIG. 2 with the window shade partially closed;

FIG. 4 is a representation corresponding to that of FIG. 2 with the window shade partially closed and raised;

FIG. 5 is a representation corresponding to that of FIG. 2 with the window shade completely closed and raised.

DETAILED DESCRIPTION OF THE PREFERRED EMBODIMENT

Figure 1:
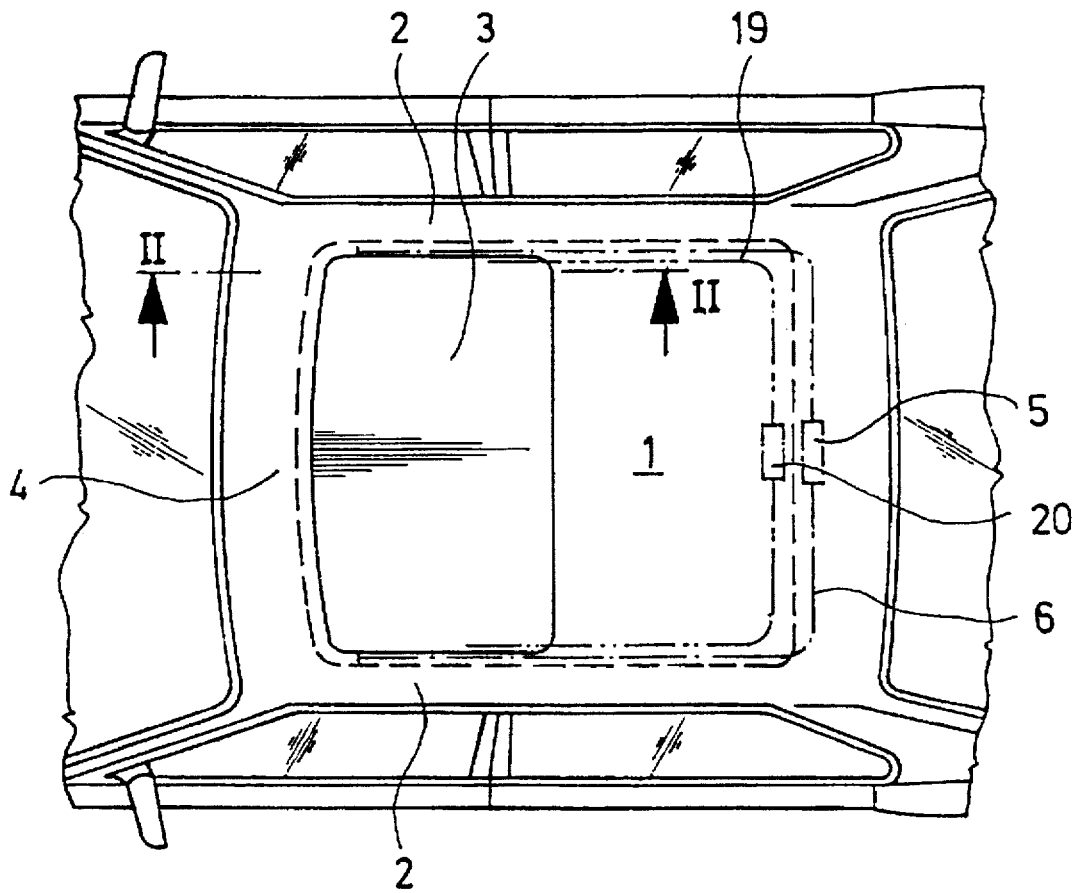
FIG. 1 is a diagrammatic top view of a vehicle roof in accordance with a preferred embodiment of the invention.
Figure 6:
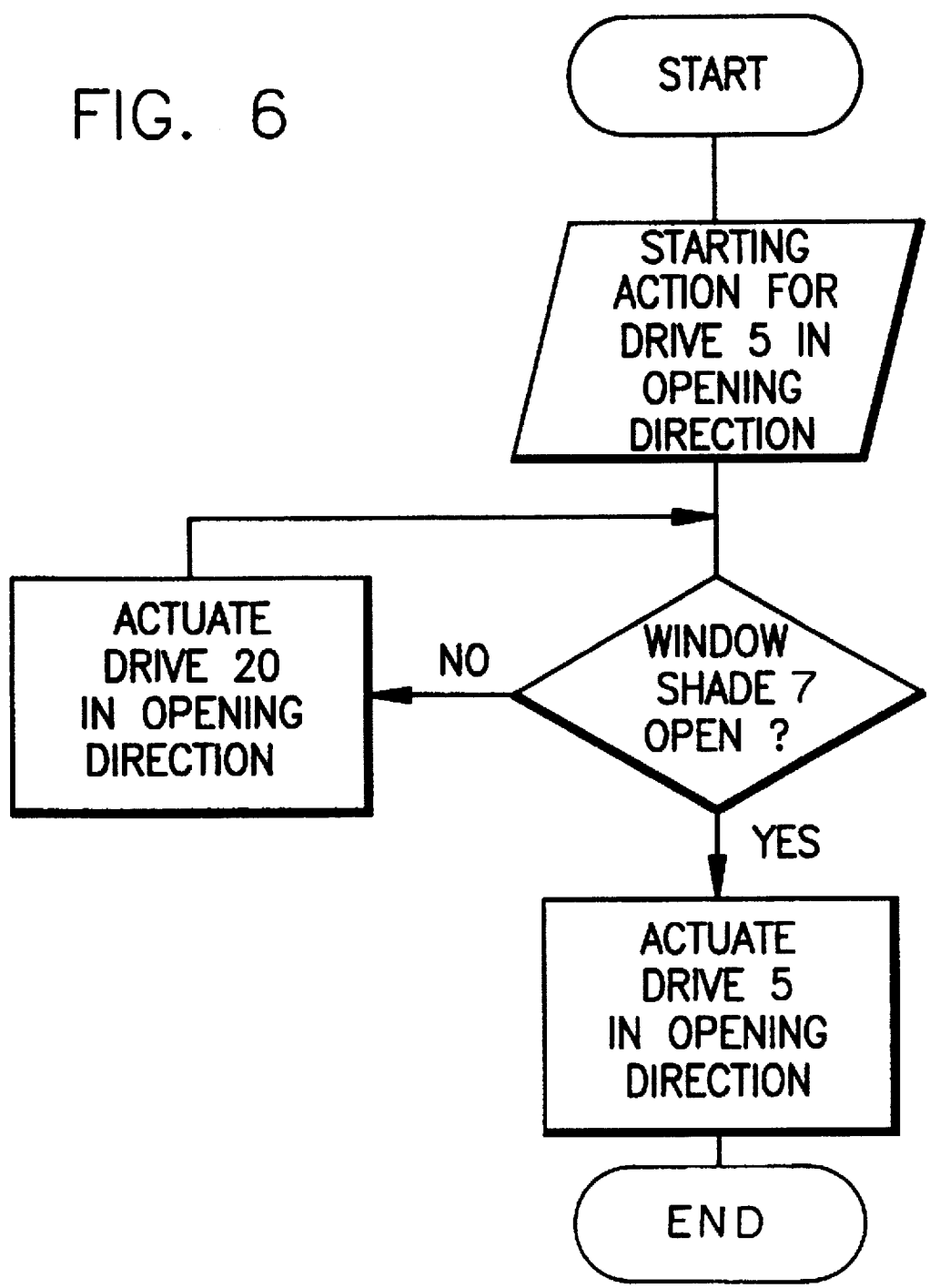
FIG. 6 is a flow chart illustrating the dependency of electric drives for moving the window shade and the roof panel.

In FIG. 1, a roof panel 3 is placed in an opening that is bounded by a fixed vehicle roof surface 1, lateral roof beams 2 and a front crossbeam 4. Roof panel 3 is pivoted in a known way around a pivot axis, not shown, that is located near its front edge and it can be slid, when its rear edge is lowered, under the fixed vehicle roof surface 1. For this purpose, roof panel 3 is supported by a suitable mechanism on lateral guide rails in the area of side beams 2 in a known way, like a sliding-lifting roof, and it can be operated by a preferably electric drive 5 and drive cables 6 to open or close it. The construction of such drive and guide mechanisms for the roof panel 3 form no part of the present invention.

A window shade designated 7 as a whole is located under front crossbeam 4 in a receiving space 9. The window shade 7 is able to be wound and unwound on a roller 8 which is also located in the receiving space 9. Window shade 7 is comprised of a length of fabric which has a rigid front element 10 fastened to its front end. When window shade 7 is in the wound-up state, the rigid front element 10 lies rearwardly of roller 8, outside of receiving space 9. The length of fabric of window shade 7 is rigidly connected to roller 8 at its end that is opposite that connected to front element 10, with the roller being elastically prestressed in the winding-up direction of window shade 7.

The rigid front element 10 is supported by lateral glide elements in a guide mechanism 11 that extends lengthwise, rearward under the roof panel 3. The front end of guide mechanism 11 is pivotably connected by a pivot pin 12 to, for example, the bearing supports for roller 8, in the immediate vicinity of the rotational axis of roller 8. On its rear end, guide mechanism 11 is elastically prestressed by a spring 13 in a downward direction.

When the window shade 7 is in the completely opened position shown in FIG. 2, a relatively large distance $Z_1$ exists between the rear end of guide mechanism 11 and the underside of roof panel 3. Because of the pivoted position of guide mechanism 11, this distance is reduced to an extremely small distance $Z_2$ when window shade 7 is closed, which is apparent in FIGS. 4 and 5. In this way, the headroom available from about the middle of roof panel 3 rearward is clearly enlarged, so that even tall passengers have no contact with the window shade 7 when it is closed.

The lifting mechanism, designated overall by 14 exhibits, has a drag lever 15 provided along side crossbeams 2, on both sides, to raise guide mechanisms 11. The front end of the drag lever 15 (to the left in FIG. 2) is connected to rigid front element 10 in a pivotable manner. The rear end of drag lever 15 is pivoted on a glide element 17 via a hinge 16. Glide element 17 is guided to slide in a stationary guide rail 18. Further, drive cables 19 for driving window shade 7 are engaged in glide element 17, and the drive cables are connected with a preferably electric drive 20, indicated diagrammatically in FIG. 1. Guiding elements 21 having tracks 22 are connected to the stationary guide rails 18, and a control pin 23, located about in the middle of the drag lever 15, engages in the track 22 of each guiding element 21. The front area of each slide track 22 has a section 22A that runs about parallel to stationary guide rail 18. Next, the slide track merges rearward into a rising ramp and steadily moves away from guide rail 18 on a slightly curved path. During a closing movement of window shade 7, starting from the fully opened position shown in FIG. 2, control pin 23 first glides in slide track section 22A about parallel to guide rail 18. In doing so, the rigid front element 10 also moves generally parallel to guide rail 18, shifting window shade 7 into a partially closed state. As soon as control pin 23 enters the rising ramp area of slide track 22, it pushes drag lever 15 upward in a steadily rising manner, and the drag lever 15, simultaneously, drags rigid front element 10 slowly rearward with window shade 7. Simultaneously, the distance Z is reduced from the distance $Z_1$ (FIG. 2) to the distance $Z_2$ (FIG. 5) in the final position.

With drive cable 19 for window shade 7, a locking element 26 is provided behind glide element 17 at a distance from it. This locking element is also able to slide in guide rail 18 and engages, when window shade 7 (FIG. 2) is completely open, in a locking slide 27 that is provided on guide mechanism M and which is open underneath and toward the rear. In this way, when window shade 7 is open, drag lever 15 is held in a stable position underneath, and simultaneously, guide elements 11 are fixed in their lower position. Locking element 26 and glide element 17 are both coupled by drive cable 19.

To increase the stability of window shade 7, other rigid elements 24 or 25 are provided at distances from one another, sewn or bonded into pockets running crosswise to the length of cloth, and also engaging laterally in guide elements 11. These rigid elements 24, 25 are separated from one another so that, when window shade 7 is in the rolled-up state, as can be seen from FIG. 2, they lie in peripheral areas that are displaced relative to one another, here opposite each other. Further, these rigid elements 24 or 25 have a curved shape that is matched to the curvature of the roller 8, additionally resulting in a reduction of the thickness of window shade 7 rolled up on roller 8.

Drive 5 for the roof panel is coupled with drive 20 for the window shade 7, so that the roof panel 3 can be moved into a lowered position only when the window shade 7 has been moved into its completely open position (FIG. 2). To facilitate operation, as depicted in FIG. 61 it is provided here that operation of a switch element for drive 5 for lowering the roof panel 3 when the window shade 7 is closed, first operates drive 20 of the window shade in the opening direction and, only after the window shade 7 is completely open, does it effect a lowering of roof panel 3. As long as roof panel 3 is in the lowered state, no closing of window shade 7 is possible because the same space used for closing the window shade is also used, according to the invention, for lowering roof panel 3.

In a roof assembled from several glass panes, window shade 7 need not, as shown, be located in a receiving space 9 that lies under a front crossbeam 4, but can instead be located under an element of the roof that serves, e.g., as a wind deflector sheet.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Vehicle roof with a pivotable roof panel, a window shade located under the roof panel for alternately covering and at least partially uncovering the roof panel by being unwound and wound from a roller, said window shade being connected with at least one rigid element which runs crosswise to a direction of movement of the window shade and which is guided in longitudinally running, lateral guide elements; wherein a lifting mechanism is provided for raising the guide elements when the window shade is moved in a closing direction covering the roof panel and for lowering the guide elements when the window shade is moved in an opening direction uncovering the roof panel.

2. Vehicle roof according to claim 1, wherein the guide elements are pivotable around a pivot pin that is located in proximity to said roller.

3. Vehicle roof according to claim 1, wherein a common drive is provided for moving both the window shade and the lifting mechanism.

4. Vehicle roof according to claim 3, wherein said drive comprises an electric motor.

5. Vehicle roof according to claim 1, wherein the lifting mechanism is coupled to a rigid element of the window shade which is connected to an end of the window shade which is foremost in the closing direction.

6. Vehicle roof according to claim 5, wherein the lifting mechanism comprises a drag lever which has a first end connected to a drive and which is slidingly guided in a stationary guide rail, and a second end which is linked to said rigid element; and wherein a control pin is provided which is connected to said drag lever and which is guided in a slide track which, in sections, is not parallel to said stationary guide rail.

7. Vehicle roof according to claim 1, wherein the window shade is provided with a plurality of rigid elements which are spaced from one another and which extend crosswise to the direction of movement of the window shade.

8. Vehicle roof according to claim 7, wherein a distance between the rigid elements is set relative to a diameter of the roller as a means for causing the rigid elements to lie in different peripheral positions when the window shade is wound on the roller.

9. Vehicle roof according to claim 8, wherein the rigid elements have a curvature that is matched to a peripheral surface curvature of the roller.

10. Vehicle roof according to claim 7, wherein the rigid elements have a curvature that is matched to a peripheral surface curvature of the roller.

11. Vehicle roof according to claim 5, wherein the guide elements are pivotable around a pivot pin that is located in proximity to said roller.

12. Vehicle roof according to claim 11, wherein the lifting mechanism comprises a drag lever which has a first end connected to a drive and which is slidingly guided in a stationary guide rail, and a second end which is linked to said rigid element; and wherein a control pin is provided which is connected to said drag lever and which is guided in a slide track which, in sections, is not parallel to said stationary guide rail.

13. Vehicle roof according to claim 5, wherein a common drive is provided for moving both the window shade and the lifting mechanism.

14. Vehicle roof according to claim 12, wherein said drive comprises an electric motor.

* * * * *